4/10/84 OR 4,442,346

United States Patent [19]

Bösinger et al.

[11] 4,442,346

[45] Apr. 10, 1984

[54] MONEY DEPOSIT AND/OR DISPENSING DEVICE

[76] Inventors: Gerhard Bösinger, Schulstr. 9, D-8857 Wertingen; Michael Backes, Herrenberg 14, D-8851 Buttenwiesen; Eberhard F. Beyhl, Unterrieden Nr. 73, D-8503 Altdorf, all of Fed. Rep. of Germany

[21] Appl. No.: 271,507

[22] Filed: Jun. 8, 1981

[30] Foreign Application Priority Data

Jun. 12, 1980 [DE] Fed. Rep. of Germany ....... 3022066

[51] Int. Cl.[3] .............................................. G06F 15/30

[52] U.S. Cl. ...................................... 235/379; 235/375

[58] Field of Search ................... 235/379; 221/15, 122

[56] References Cited

U.S. PATENT DOCUMENTS

| | | | |
|---|---|---|---|
| 3,135,422 | 6/1964 | Woodruff | 221/122 |
| 3,456,817 | 7/1969 | Irazoqui | 221/122 |
| 3,753,486 | 8/1973 | Vogt | 221/122 |
| 3,957,173 | 5/1976 | Roudebush | 221/15 |

*Primary Examiner*—Harold I. Pitts

*Attorney, Agent, or Firm*—Donald Brown

[57] ABSTRACT

A money deposit and/or dispensing device has a plurality of bank note reception compartments or cases mounted on a movable support rotatably mounted in a safe type housing. The housing has an opening for allowing access to one of the compartments located in front of the opening. A closure member such as a sliding door is associated with the opening and adapted to be brought into an opening position under control of a central control unit. The control unit enables the opening position of the closure member only after predetermined conditions are fulfilled, particularly after a predetermined timing delay after introduction of an appropriate instruction by the user through a keyboard has lapsed. The compartments may be selectively moved in front of the opening so that only the selected compartment is accessible through the opening.

9 Claims, 5 Drawing Figures

MONEY DEPOSIT AND/OR DISPENSING DEVICE

BACKGROUND OF THE INVENTION

The invention generally relates to the field of money deposit and dispensing devices, particularly devices of this kind having a plurality of compartments in a housing and a closure member associated with the opening and placed under the control of a control unit enabling the closure member to be brought into an opening position only after predetermined conditions are complied with.

In a known device of this kind, the individual compartments for receiving bank notes are arranged one above the other in adjacent rows. Each compartment row may be closed by a closure member of sliding door type. Initially, all of the doors are completely closed. In each row associated with determined bank notes, the respectively next compartment may be opened by opening the corresponding sliding door. On the one hand, this has the drawback that any third person will immediately determine from outside how many compartments are already empty and how many are still filled with bank notes. On the other hand, those compartments of a row associated with a first kind of bank notes which have been emptied in the meantime cannot subsequently be simply used for storing bank notes of another value, as these would then be released upon the next request of bank notes of the previous value. Furthermore, the known device is very bulky and needs much space.

OBJECTS OF THE INVENTION

A primary object of the invention is to provide an improved device for deposit and dispensing of money, particularly bank notes, which is free from the above mentioned drawbacks.

A further object of the invention is to provide a money deposit and dispensing device in which individual bank note reception compartments are selectively movable in front of an opening in a housing of safe type.

SUMMARY OF THE INVENTION

In accordance with the invention, the money deposit and/or dispensing device has a plurality of bank note reception compartments or cases mounted on a movable support, preferably a rotational support rotatably mounted in a frame or housing. The housing has an opening for allowing access to one of the compartments located in front of the opening. A closure member such as a sliding door is associated with the opening and adapted to be brought into an opening position under control of a central control unit. The control unit enables the opening position of the closure member only after predetermined conditions are fulfilled, such as the lapse of a predetermined timing delay after introduction of an appropriate instruction by the user through a suitable instruction input arrangement such as a keyboard. The compartments are selectively movable in front of the opening so that only the selected compartment is accessible through the single opening.

BRIEF DESCRIPTION OF THE DRAWINGS

Further objects, features and advantages of the invention will stand out from the following non-limitative description of an exemplary embodiment with reference to the drawings. In the drawings.

DESCRIPTION OF THE PREFERRED EMBODIMENT

Figure 1:
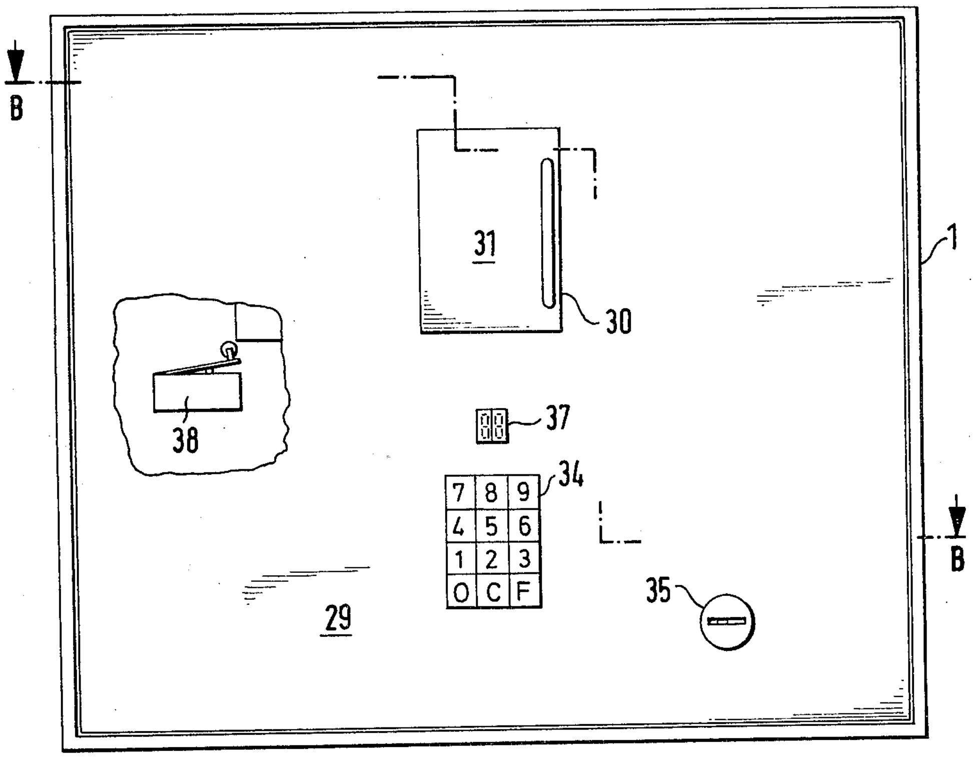
FIG. 1 shows a front view of one embodiment of the inventive device in partially broken-away representation.

As seen in the figures, the safe-type device has a housing 1 with a base plate 2. A bottom plate 3 rotatable about an axis perpendicular to the base plate has a bearing sleeve 4 on its bottom fixed thereto. The sleeve is mounted on a shaft 6 through a bearing 5. The shaft is in turn secured on the base plate 2. The bottom plate 3 is provided with a stud 7 projecting from its plane. Further, in its centre and concentric with the rotational axis of the bearing sleeve 4, an upwardly projecting threaded bolt 8 is provided which is secured on the bottom plate, e.g. by welding, in a manner to be fixed against rotation. A sprocket wheel 9 is secured on the bearing sleeve 4 and connected through a chain 10 with the driving wheel 11 of a driving device formed by a motor 12. The motor is suitably mounted on a side wall connected with the base plate.

Figure 2:
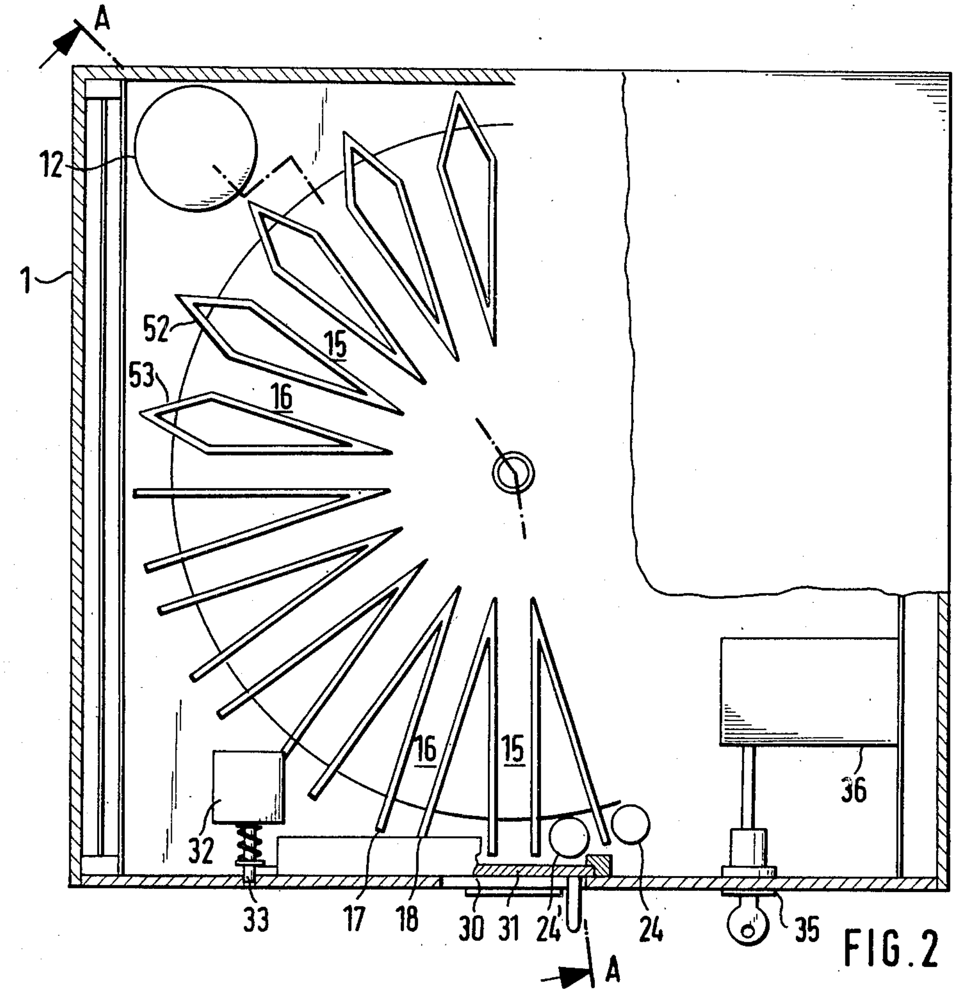
FIG. 2 is a section along line B—B in FIG. 1.

The supporting member 13 proper rests on the bottom plate 3. It has a bottom 14. As best seen in FIG. 2, a plurality of compartments 15, 16 are formed by partition walls 17, 18 in radial direction. Bank notes may be introduced into the compartments 15, 16. To this end, the depth and the height of the compartments correspond at least to the length and the height of the dimensions of the bank notes to be stored within the device.

In its centre, the bottom is provided with a tube 19 projecting upwardly and used to delimit the compartments 15, 16 towards the centre, on the one hand, and which, on the other hand, has an inner thread adapted to be screwed on the threaded bolt 8 for locking the supporting member 13 on the bottom plate 3.

The bottom 14 is provided with a recess 22 on its bottom side corresponding to the stud 7. This will assure that the bottom of the supporting member will always engage the bottom plate 3 in a predetermined direction when in a predetermined rotational position.

Figure 3:
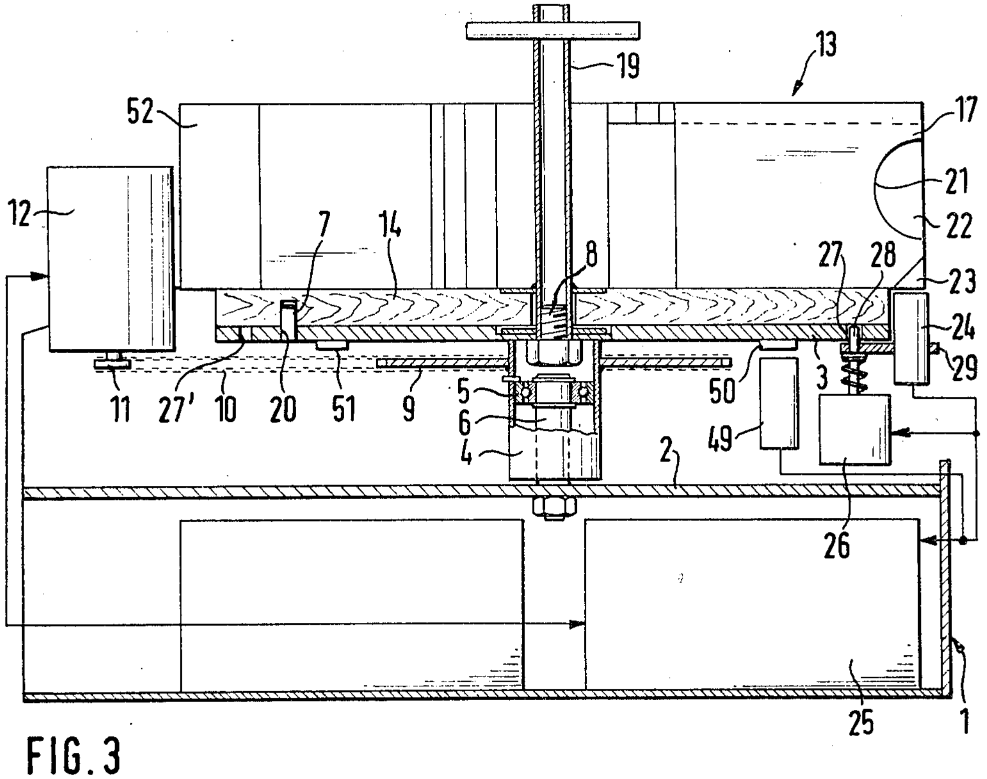
FIG. 3 is a section along line A—A in FIG. 2, the housing being omitted for clarity.

The partition walls 17, 18 are provided with recesses 21 on their outer edges, as best seen in FIG. 3, to allow grasping of the bank notes 22 located within the compartments. The partition walls 17, 18 slightly extend beyond the bottom 14 so that the bank notes located within the compartments project from the compartment on their lower outer ends 23.

Directly on the outside of the bottom 14, at least one proximity switch 24 mounted on the bottom plate 3 is provided which is arranged in such a manner that it is located below the ends 23 of a bank note pack located thereabove. In the exemplary embodiment shown, a proximity switch is shown arranged at a circumferential distance of one compartment spacing from the compartment located in front of the opening of the housing.

However, a plurality of such proximity switches may be provided. Preferably, a number of proximity switches corresponding to the number of compartments 15, 16 is provided in circumferential direction. One of the proximity switches is located below one of the compartments when the supporting member is at rest, and the other proximity switches are respectively circumferentially staggered by one compartment spacing with respect to the preceding one. The output signal of the proximity switch 24 is supplied to a control arrangement 25 through a suitable line.

On the bottom side of the bottom plate 3, a locking device 26 is provided, e.g. a solenoid, which is fed by the output signal of the control arrangement 25 and which, upon interruption of current flow, locks the supporting member with its compartments against further rotation by a locking bar 28 engaging into a bore 27, 27'.

Within the front housing wall 29 an opening 30 is provided on the level of the compartments 15, 16. Its height corresponds at least to the height of the compartments 15, 16, and its width is less than the spacing of the outer ends of two walls 17 of adjacent compartments 15, 16, but at least as wide as the width of one compartment 15, 16. The opening 30 is closed by a sliding door 31 arranged on the inner side of the housing front wall. A locking device 32, e.g. of solenoid type, is provided mounted on the frame to normally lock the sliding door 31 against opening, by a locking bar 33, as best seen in FIG. 2. The locking device 32 is supplied by the output signal of the control arrangement 25 through an appropriate line. In its released state, the sliding door 31 may be preferably sufficiently opened to such an extent that one compartment 15 is completely accessible.

On the front side of the device, a keyboard 34 is provided as an instruction input arrangement the output signal of which is fed to the control device 25 through a convenient line. Further, a switch 35 accessible from the front side and which may be actuated by a key, is provided for adjusting a timing device 36. Further, a segmental display 37 is arranged on the front housing wall and connected with the control apparatus 25 and the timing apparatus 36 so that its display is controlled in dependance thereon.

As indicated in FIG. 1, a door position sensor 38, e.g. of micro switch type, is provided. Its output signal is supplied to the control arrangement 25. When the micro switch of the door position sensor 38 is actuated by opening the door, the locking device 26 is maintained in its locked position, and current supply to the stepping motor 12 is interrupted.

Figure 4:
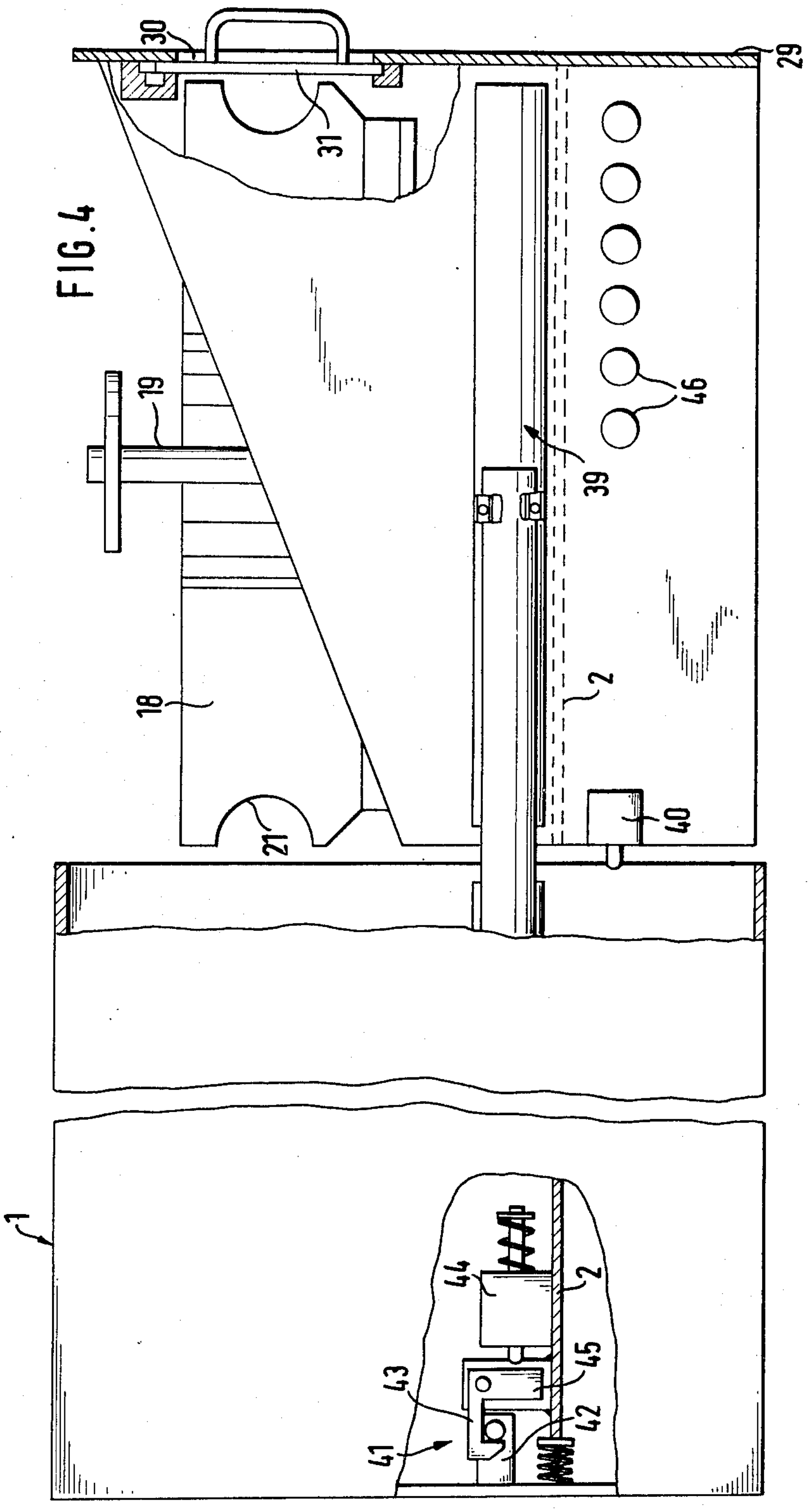
FIG. 4 is a side view of the device showing an extensible insert mount for mounting a drawer type insert, some housing portions being broken away for clarity.

As best seen in FIG. 4, the entire arrangement as above disclosed, including the front housing wall 29, is connected with the remaining housing 1 through a telescopic extension system in the manner of a drawer. The drawer is provided with a drawer sensor 40, e.g. of micro switch type, providing energization of the power supply when the drawer is pushed in.

In the left hand part of FIG. 4, a drawer releasing device 41 is provided shown in a position in which the drawer is locked within the housing. The drawer locking device consists of an armature portion 42 secured on the housing wall and a pivotable hook 43 secured on the base plate 2 and a solenoid 44. When the drawer is pushed in, the hook 43 engages with the armature part 42 to lock the drawer against extension. Release may be achieved by the action of the solenoid 44 on the leg 45 of the hook 43. The solenoid 44 is also controlled by an output signal of the control arrangement 25. On the side of the drawer, six timing selector switches 46 are provided which are connected with the timing apparatus 36 or the control arrangement 25. They are accessible only when the drawer is extended from the housing.

Figure 5:
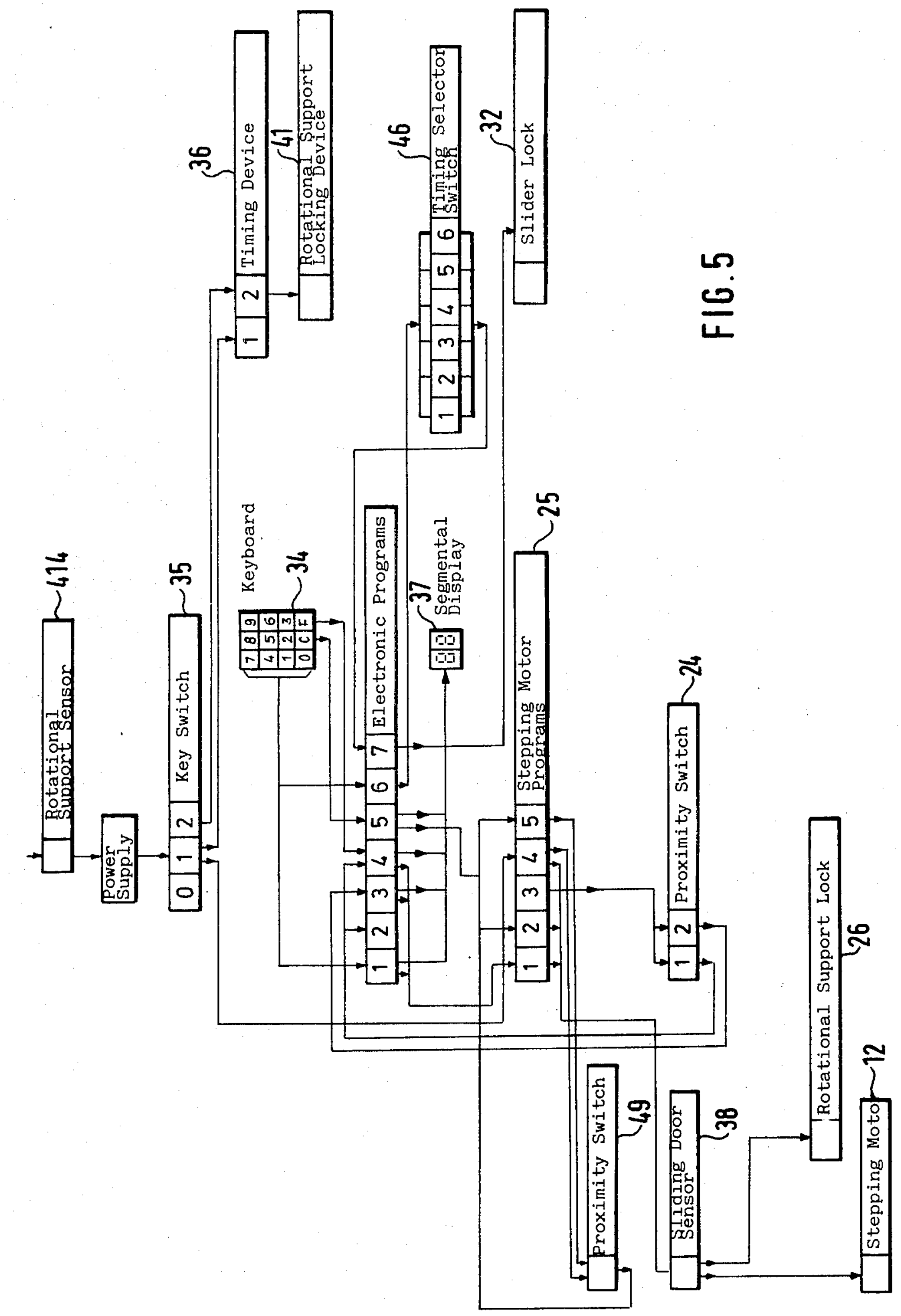
FIG. 5 shows a schematic diagram illustrating an operating sequence of a control unit of the device.

FIG. 5 shows a block diagram showing the signal lines between the above described elements. Hereunder, the operation of the device elements shall be described with reference particularly to this figure.

After the drawer sensor 40 is brought into its closed state by pushing in of the drawer, the power supply is energized. The key is introduced into the switch 35 and moved from position 0 (current supply interrupted) into the position 1. A corresponding signal will be supplied to the control arrangement 25 and the timing apparatus 36. In case the drawer should be pulled out, the key is brought into position 2. This will prevent operation and particularly opening of the sliding door, and the key cannot be removed. The timing apparatus 36 will release the locking of the device 41 through the solenoid 44 after a predetermined time of e.g. 15 minutes has lapsed, so that the drawer may be pulled out and the supporting member 13 removed.

For normal operation with the key in position 1, instructions may be introduced by the keyboard 34. The keys with the numbers 0 through 9 are used to select compartments of determined bank note values, key C is used for correction and key F is used for requesting empty compartments to be filled. A determined compartment or a compartment with determined bank notes is selected through the keyboard. The stepping motor 12 is supplied by the control arrangement with a signal causing the respective compartment 15 to be moved in front of the opening 30. The signal of key C cancels the requested position, and the stepping motor program is interrupted to stop the motor. Depending on the instruction introduced through the keyboard and on the time delay preadjusted by the timing selector switch 46, the locking device 32 is controlled in a manner to release the sliding door 31 after the timing delay has lapsed.

In the stepping motor program, the four positions indicated in FIG. 5 have the following significations:

Position 1: The stepping motor receives signals for the requested position.

Position 2: The stepping motor receives a stop signal.

Position 3: 9° prior to reaching the requested position of a compartment, the proximity switch is switched on and is switched off again after 15°.

Position 4: The stepping motor receives the signals for 360° from the signal of switch 35.

When the proximity switch 24 detects the presence of bank notes, it will deliver a corresponding signal to the control arrangement 25. After the predetermined delay time has lapsed the locking device 32 is controlled to release the sliding door. By opening the sliding door, the micro switch actuated by the door position sensor 38 will interrupt the circuit of the solenoid 44, the locking device 26 and the stepping motor 12 so that the merry-go-round type supporting member will remain in its position. By engagement of the locking bar 28 in the bore 27, the supporting member is locked against rotation.

To fill the device, the supporting member 13 is withdrawn from the pulled-out drawer. The 20 compartments shown in the exemplary embodiment are filled with bank notes of different values. The bank note values may be associated with determined compartment numbers which have been introduced into the control arrangement 25, or the operator remembers the association of the bank note values with the compartment numbers. After having been filled, the supporting member is fitted on the extended drawer with a relative position predetermined by the stud 7 and the recess 20 and is locked by means of the tube 19 and the bolt 8. As long as the drawer is extended, the desired time delay may be introduced through the timing selector switches 46 associated with the respective individual compartments. Each switch is adjustable from 20 to 180 seconds at 20 seconds intervals. After the filling operation, the drawer is completely pushed into the housing so that the latch shaped hook 43 engages the armature part 42 to provide positive locking. Simultaneously, the switch of the drawer sensor 40 and thus the power supply is switched on.

After introducing the key into the switch 35 and turning into position 1, each desired compartment may be moved into the position in front of the opening 30 through the instructions introduced via the keyboard 34. After the corresponding time delay has lapsed, the sliding door 31 is released and may be opened. As long as the sliding door is opened, the supporting member is locked against further rotation. The next compartment selection will only be possible when the sliding door is closed. Upon a 2 digits compartment selection, both keys have to be pushed within half a second. Using the key C, the previous input may be cancelled. The segmental display will indicate two zeros. Thereafter, repeated input will be possible. The time delay starts after the last input. In case the selected compartment is empty, the merry-go-round type magazine will automatically move on to the next filled compartment.

The introduction of money for storing the same is performed in the same manner as the above disclosed withdrawal of money. Selection of an empty compartment is achieved by pushing key F. By pushing key F, the respective next empty compartment is moved in front of the opening. When selecting an empty compartment, the time delay is inoperative.

When the device is switched off by positioning the key into the position 0, an opening of the device is precluded, even in case of removed mains plug or power failure. Opening will only be possible by adjustment of switch 35 into the key position 2. Then, the drawer may be withdrawn after 15 minutes, and the supporting member removed.

The supporting housing 1 is formed of a steel envelope as generally used for safes.

In the above disclosed embodiment, only one bore 27, 27' is mentioned. Actually, a number of such bores corresponding to the number of compartments will be provided on the periphery with a circumferential spacing corresponding to the compartment spacing, so that the supporting member 13 may be locked by means of the locking device 26 each time one of the compartments is moved in front of the opening.

Generally, the control circuit 25 may detect from the signals fed to the stepping motor 12 which of the compartments is just located in front of the opening. However, as shown in FIG. 3, a proximity switch 49 mounted on the front housing wall 29 may be provided for cooperation with an adjustment or indicator flag 50. As soon as the indicator flag approaches the proximity switch, the latter will provide a signal to a stepping motor program within the control circuit 25. Thereafter, the stepping motor receives signals for the requested position. 9° prior to a predetermined compartment reaching the requested position, the proximity switch is closed and 15° thereafter ist reopened. By the signal of switch 35, the stepping motor 12 will receive the signals for a 360° rotation, and simultaneously the proximity switch 49 will be switched on. When the latter has provided the signal to the stepping motor, it is switched off.

In accordance with a further embodiment, indicator flags 50, 51 are provided on the bottom side of the bottom plate 3 and are associated with each individual compartment to provide an individualization thereof, by which the proximity switch 49 will be able to recognize the individual compartments. The proximity switch is in turn connected with the control circuit 25 through a signal line.

In the above disclosed embodiment, the proximity switch 24 is arranged in such a manner that it is located below a compartment situated thereabove when the supporting member is in its locked state. In accordance with another embodiment, only one proximity switch 24' is provided which is indicated in interrupted lines in FIG. 2. The latter is provided in circumferential direction directly adjacent the location of a compartment lying in front of the opening, preferably spaced by half a compartment spacing (9°) from the location of a compartment situated in front of the opening. When a corresponding compartment is selected and when the proximity switch 24' determines that bank notes are present in the selected compartment, it will deliver a signal to the program of the control arrangement 25. This program has the following sequence:

The requested position is selected through the keyboard. The actual position is stored in a memory, and requested and actual positions are compared. The difference will determine the stepping program. If a signal is received from the proximity switch 24', the selection remains as above. If no signal is received, however, because no bank notes are present within the compartment, the stepping motor program provides a constant value corresponding to one compartment spacing on the supporting member. The number of the compartment positioned at that time will appear on the segmental display. If a signal is received from the proximity switch or from the key F, a constant value is supplied to the stepping motor program corresponding to one compartment spacing on the supporting member. The number of the compartment positioned at that time appears on the segmental display.

The signal of the C key cancels the requested position and the stepping motor program is interrupted to stop motor 12.

The input signal from keyboard 34 will reach the timing selector switch 46. After selection on the timing selector switch 46, a delayed signal is delivered to the locking device 32.

In the above disclosed exemplary embodiment, the solenoid 44 is controlled by an output signal of the control arrangement 25. In accordance with another embodiment, the timing apparatus 36 operates in a manner independent on the timing selector switch 46. The timing apparatus 36 is electrically wound up by the signal of the key-operated switch 35. Subsequently, the time delay will proceed mechanically. The following mechanical pulse will be transmitted to the drawer releasing device 41 to operate release thereof. Thereafter, the drawer may be pulled-out. The timing members of the timing selector switch 46 are contained in the control arrangement 25.

Further, the partition walls defining the compartments and which extend in substantially parallel manner for holding bank note packs, may converge on their outer ends 52, 53 in convexed manner to render introduction of the bank note packs easier.

It should be understood that the above description is in no way limitative and that many modifications and improvements may be brought to the various embodiments without departing from the true spirit of the invention.

What is claimed is:

1. A device for deposit and/or dispensing of money having a plurality of bank note reception compartments in a housing, an opening and as associated closure member being provided in said housing for allowing access to one of said compartments when said closure member is in an open position, and means for moving said compartments within said housing to bring said compartments in registration with said opening, comprising control means for controlling said closure member after each closure thereof to enable said opening position independently of the movement of said compartments only a predetermined delay time after an opening instruction is introduced into said control means through an instruction input generator.

2. A device of claim 1, wherein sensor means for checking the compartments with respect to their contents are provided.

3. A device of claim 1, wherein said compartments are arranged on an insert removable from said housing.

4. A device of claim 3, wherein said support is formed to be removable from said insert.

5. A device of claim 3 or 4, wherein said insert is enabled to be pulled out of the housing only a predetermined time after delivery of an instruction to said control means.

6. A device of claim 1, wherein said predetermined delay time has different durations for different compartments.

7. A device of claim 1, wherein said control means is adapted to control said moving means to move selected ones of said compartments directly in front of said opening.

8. A device of claim 7, wherein said selected ones of said compartments are empty compartments.

9. A device of claim 8, wherein said movement of an empty compartment directly in front of said opening, said opening position of said closure member is enabled only after a predetermined delay time.

* * * * *